May 24, 1960 J. L. E. POUGNET 2,937,463
MACHINE FOR DIGGING AND CLEANING DITCHES AND CANALS
Filed Feb. 8, 1954 3 Sheets-Sheet 1
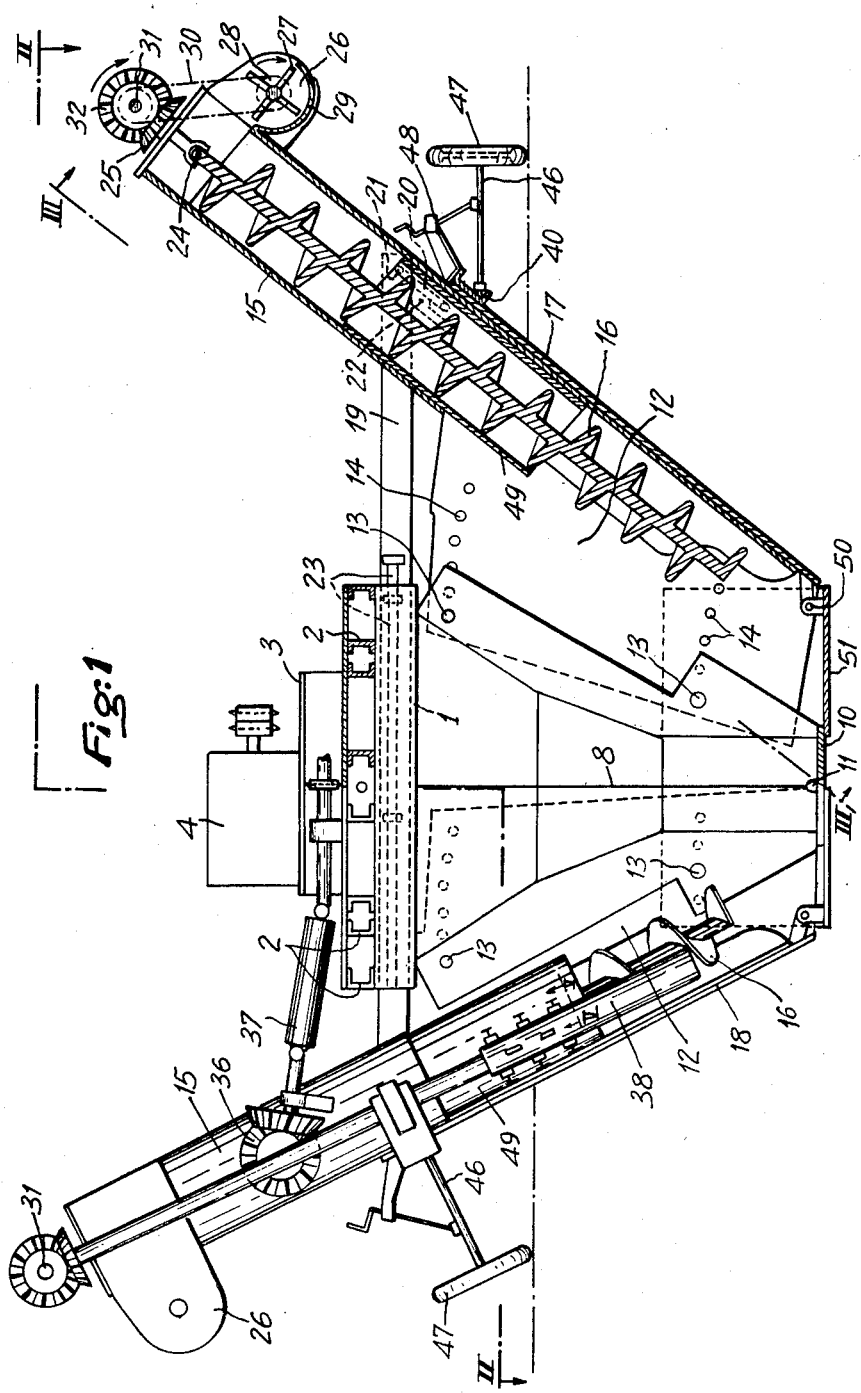

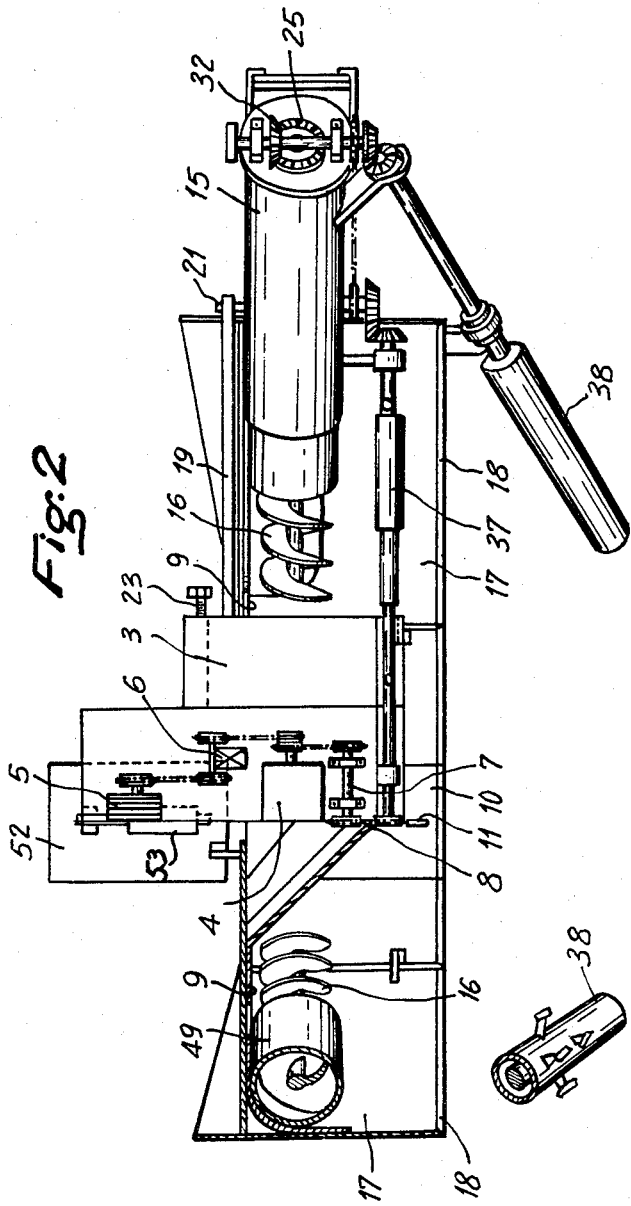

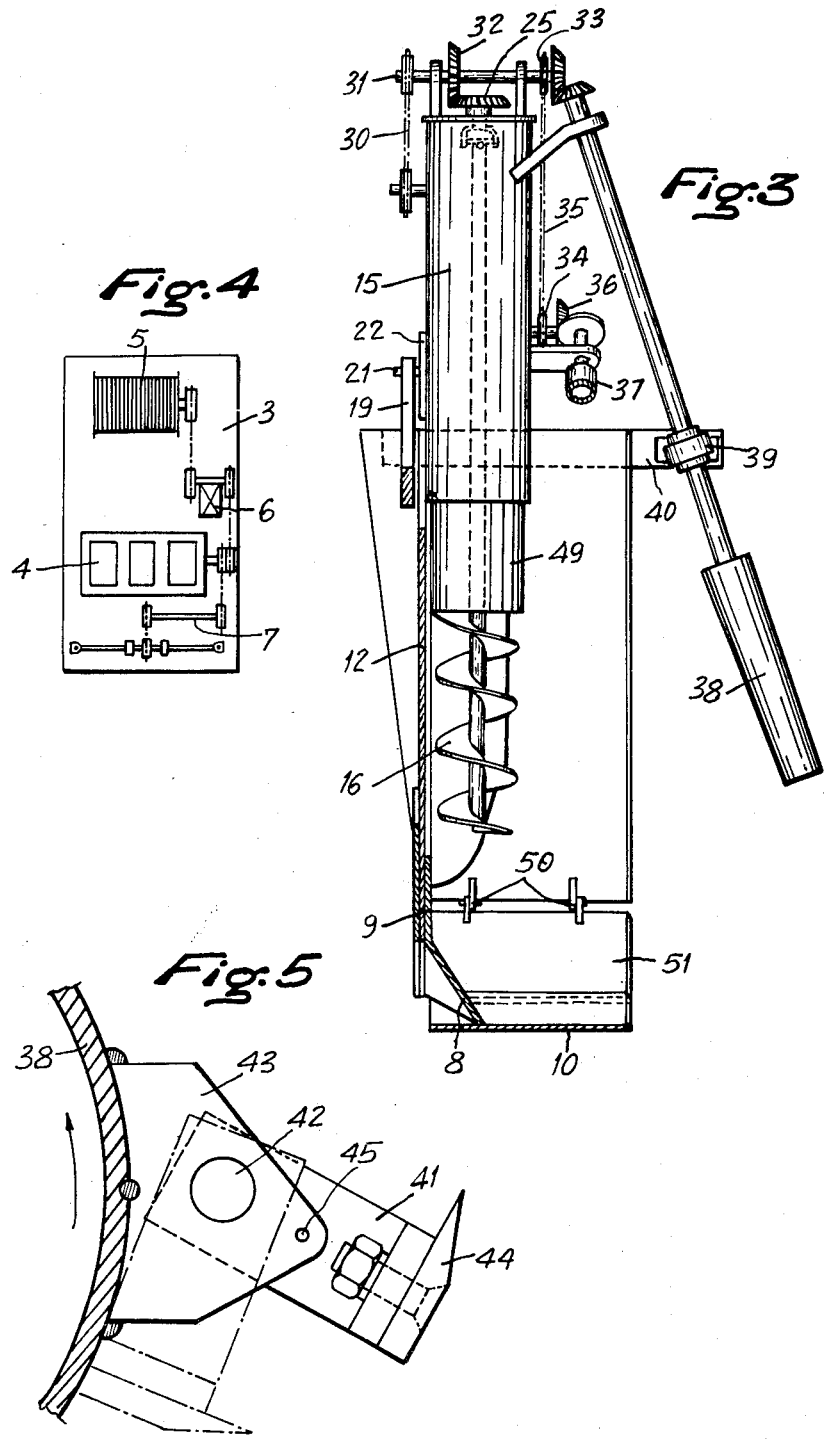

United States Patent Office
2,937,463
Patented May 24, 1960

2,937,463

MACHINE FOR DIGGING AND CLEANING DITCHES AND CANALS

Jean Louis Etienne Pougnet, 2 Ter, Rue Chasles, Rambouillet (Seine-et-Oise), France Filed Feb. 8, 1954, Ser. No. 408,973

Claims priority, application France Feb. 9, 1953

9 Claims. (Cl. 37—99)

My invention has for its object a machine adapted to dig and clean ditches, canals and water reaches, said machine or dredge sliding over the bottom of said canals either through self-propulsion or under control of another vehicle.

My improved machine includes chiefly adjustable cutting members adapted to match the trapezoidal cross-section of the ditch, canal or water reach to be cleaned, a central section forming a stem located axially of the machine to the rear of the cutting members and adapted to project laterally the dug out materials, two lateral elevators collecting the dug out materials to either side of the stem and hoisting them above the level of the banks of the excavation, further members adapted to discharge over said banks the material raised by the elevators, and a frame interconnecting these various parts and carrying a platform on which is mounted the power unit driving said elevators.

At least those parts of the cutting members acting on the upper sections of the banks comprise preferably a plurality of rotary cutters driven by the power unit on the machine.

The cutting members include preferably, in addition to these rotary cutters, a horizontal central blade or share rigid with the lower end of the stem, two lateral horizontal blades forming lateral extensions of the central blade, said lateral blades being adjustable as to position, and two oblique cutter knives including a cutting edge adapted to act to the rear of the rotary cutters, said knives being adjustable as to spacing and as to slope.

The elevator members are preferably constituted by screws, the casings enclosing which are rigid with the corresponding knives while transverse flanges are removably adjustably secured to the stem of the machine to connect said stem with the corresponding casings.

The members adapted to transfer onto the banks the material raised by the elevators preferably comprise ejectors of the rotary blade type.

The machine may furthermore include laterally stabilizing members and also a longitudinal stabilizing member which latter is in this case mounted at the rear end of the stem and is constituted by a shoe the position of which is adjustable over the already cut surface of the canal or the like excavation. The power unit of the machine is preferably used not only for driving the elevators and the rotary cutters but also for ensuring self-propulsion of the machine preferably through a winch acting on a cable passing through a pulley block and providing for the drive of the stem through action on both its upper and lower ends.

I will now describe a preferred embodiment of a machine according to my invention, reference being made to accompanying drawings, wherein:

Fig. 1 is in its left part an elevational view of the machine and in its right part a cross-section through the axis of the conveyor screws of said machine, the adjustment being different in both parts.

Fig. 2 is a cross-section and plan view through line II—II of Fig. 1.

Fig. 3 is a view through line III—III of Fig. 1.

Fig. 4 is a plan view of the platform of the machine.

Fig. 5 is a detail view of the tools forming the operative parts of the rotary cutters.

The frame of the machine includes two transverse girders 1 carrying longitudinal beams 2 forming a system of beams carrying a table 3, on which is mounted the power unit 4 forming the general driving means for the machine, said power unit controlling a winch 5 (Fig. 4) through a change speed gearing 6 operated by a chain or endless belt as diagrammatically illustrated.

To the underside of said frame are secured directly the members forming the stem 8 including a number of dihedrals, the upper dihedrals opening gradually to a greater extent and merging laterally into flanges 9 (Fig. 2).

The lower end of the stem is rigid with the main horizontal share or blade 10 to which is secured an eye 11 forming the attachment for the end of the hauling cable.

To the flanges 9, further lateral flanges 12 are secured through pins 13 adapted to engage openings 14 in said flanges 12. The openings 14 in each flange 12 form a series, the selective engagement of the openings in said series by the corresponding pin 13 providing for adjustment of the spacing and slope of the lateral flanges 12.

The outer edge of each flange 12 is rigid with a casing 15 for an elevator or conveyor screw 16 with a flange 17 at right angle with respect to said flange 12, the front edge of which is provided with a cutting edge 18 forming a lateral flange knife. Said knives are connected with the upper part of the frame by shaped members 19 adapted to slide along the girders 1 and provided with pins 21 engaging elongated slots 20 carried by linings 22 rigid with the casings 15. Said slot and pin arrangement secures a further attachment for the knives, the slot allowing the variation of the slope of the knives and flanges according to the variations in the shape of the section of the digged canals. The shaped members 19 may be spaced to an adjustable extent by a screw means 23 that allows adjusting in cooperation with the openings 14 the spacing and the slope of the terminal knives 18.

The slope of the lateral knives being variable and adjustable as required, it is possible for said knives to match as required, it is possible for said knives to match the outline of the cross-section of the excavation even if said cross-section is dissymmetrical.

At the lower part of each of the flanges 17 is hingedly connected by hinges 50 an horizontal plate or share 51 provided with a front cutting edge.

In each of the casings 15 is mounted an elevator or conveyor system 16 constituted by a worm or endless screw suspended through a cardan joint 24 to the upper end of the casing, and driven by a bevel gear 25. Each casing is provided at the upper end of its outer wall with a lateral opening while a rotary blade ejector 26 is located on the outside of the casing just underneath said lateral opening.

Furthermore, two sleeves 49 slidingly carried along the inner walls of the casing at the lower end of the latter allow adjusting the operative length of the casing, according to requirements.

The ejector 26 is constituted by a blade system 27 revolubly carried by a spindle 28 inside an auxiliary casing 29, said blade system rotating so as to project upwardly the material passing out of the lateral gate associated with the ejector. The sprocket 28 is driven by a chain 30 controlled by another sprocket 31 which together with the bevel wheel 32 meshing with the bevel wheel 25 driving the worm conveyor 16, is keyed on a shaft driven through the sprockets 33 and 34, a chain 35 and a bevel gear 36. by a telescopic cardan shaft 37 which is operated by the intermediate shaft 7.

Two rotary cutters 38, carried on two bearings 39 secured to the shaped members 40 forming a reinforcement for the lateral knives, operate to the front of the latter with a view to cleaning and disaggregating the upper sections of canal or the like excavation. The rotary cutters 38 carry tools (Fig. 5) constituted by members 41 each rotatably carried by a spindle 42 between two flanges 43 rigid with the cutter body.

To the outer end of the member 41 is secured a cutter blade 44 which is held in position by means of a pin 45 passing through flanges 43 and member 41 and adapted to break in case of the ground providing an abnormal resistance, whereby the tool 41–44 is adapted to enter the position illustrated in dot and dash lines.

Two stabilising arms 46 (Fig. 1) are pivotally carried on the shaped arms 40 reinforcing the lateral knives 18 and they are adapted to engage the banks of the canal through wheels or shoes 47. These stabilising arms 46 are pivotally connected with the shaped members 40 so as to allow adjusting through the operation of jacks 48, the slope and thereby the level of the wheels or shoes.

A shoe 52 is pivotally secured to the rear end of the main cutting blade or share 10 and its location is controlled by a jack 53 the upper end of which is connected to the frame of the machine so as to define the depth of operation of the machine provided by a modification in the angle of engagement with the ground.

The embodiment disclosed hereinabove, by way of a mere exemplification, may obviously be modified without widening unduly the scope of the invention as defined in accompanying claims.

What I claim is:

1. A machine for cleaning and digging ditches, canals and the like excavations, comprising adjustable members provided with forward cutting edges and adapted to engage the bottom of the excavation, a stem located at the rear of the adjustable members and assuming cross-sectionally the shape of a rearwardly flaring dihedral, the angle of which opens gradually from the bottom to the top of the stem, said stem being adapted to project laterally the earth cut out in operation, two lateral elevating means adapted to be fed by the earth projected laterally by the lower end of the stem and to raise said earth above the level of the banks to either side of the excavation, means for discharging onto said banks the earth raised by the elevating means, a frame carrying the adjustable members, the stem, and the elevating means, and a power unit carried by said frame and for operating the elevating means.

2. A machine for cleaning and digging ditches, canals and the like excavations, comprising adjustable members provided with forward cutting edges and adapted to engage the bottom of the excavation, rotary cutters adapted to cut at least part of the sloping sides of the excavation, a stem located at the rear of the adjustable members and assuming cross-sectionally the shape of a rearwardly flaring dihedral, the angle of which opens gradually from the bottom to the top of the stem, said stem being adapted to project laterally the earth cut out in operation, two lateral elevating means adapted to be fed by the earth projected laterally by the lower end of the stem and to raise said earth above the level of the banks to either side of the excavation, means for discharging onto said banks the earth raised by the elevating means, a frame carrying the adjustable members, the rotary cutters, the stem, and the elevating means, and a power unit carried by said frame for operating the elevating means, and means whereby the power unit operates the rotary cutters.

3. A machine for cleaning and digging ditches, canals and the like excavations, comprising members provided with forward cutting edges and adapted to engage the bottom of the excavation and including a central horizontal share and two adjustable horizontal lateral shares extending laterally beyond the central share, means for adjusting the relative position of the lateral shares, two oblique transverse cutters arranged in parallelism with the axis of progression of the machine and to either side thereof, means for adjusting the spacing and the slope of said oblique cutters, rotary cutters adapted to cut at least part of the sloping sides of the excavation to the front of the oblique cutters, a stem located to the rear of the adjustable members rigid with the central share and assuming cross-sectionally the shape of a rearwardly flaring dihedral, the angle of which opens gradually from the bottom to the top of the stem, said stem being adapted to project laterally the earth cut out in operation, two lateral elevating means adapted to be fed by the earth projected laterally by the lower end of the stem and to raise said earth above the level of the banks to either side of the excavation, means for discharging onto said banks the earth raised by the elevating means, a frame carrying the adjustable members, the rotary cutters, the stem, and the elevating means, and a power unit carried by said frame for operating the elevating means, and means whereby the power unit operates the rotary cutters.

4. A machine for cleaning and digging ditches, canals and the like excavations, comprising members provided with forward cutting edges and adapted to engage the bottom of the excavation and including a central horizontal share and two adjustable horizontal lateral shares extending laterally beyond the central share, means for adjusting the relative positions of the lateral shares, two oblique transverse cutters arranged in parallelism with the axis of progression of the machine and to either side thereof, means for adjusting the spacing and the slope of said oblique cutters, rotary cutters adapted to cut at least part of the sloping sides of the excavation to the front of the oblique cutters, a stem located to the rear of the adjustable members rigid with the central share and assuming cross-sectionally the shape of a rearwardly flaring dihedral, the angle of which opens gradually from the bottom to the top of the stem, said stem being adapted to project laterally the earth cut out in operation, two eleaving conveyor worms adapted to raise the excavated earth between the lower end of the stem and a point located above the corresponding side of the excavation, a casing enclosing each conveyor worm and rigid with the corresponding oblique cutter, transverse flanges removably and adjustably connecting the corresponding worm casing with the stem, means for discharging onto the banks to either side of the excavation the earth raised by the elevating conveyor worms, a frame carrying the adjustable members, the rotary cutters, the stem, and the elevating conveyor worms, a power unit carried by said frame for operating the elevating conveyor means, and means whereby the power unit operates the rotary cutters.

5. A machine for cleaning and digging ditches, canals and the like excavations, comprising adjustable members provided with forward cutting edges and adapted to engage the bottom of the excavation, rotary cutters adapted to cut at least part of the sloping sides of the excavation, a stem located at the rear of the adjustable members and assuming cross-sectionally the shape of a rearwardly flaring dihedral, the angle of which opens gradually from the bottom to the top of the stem, said stem being adapted to project laterally the earth cut out in operation, two lateral elevating means adapted to be fed by the earth projected laterally by the lower end of the stem and to raise said earth above the level of the banks to either side of the excavation, rotary blade ejectors for discharging onto said banks the earth raised by the elevating means, a frame carrying the adjustable means, the rotary cutters, the stem, and the elevating means; a power unit carried by said frame for operating the elevating means, and means whereby the power unit operates the rotary cutters.

6. A machine for cleaning and digging ditches, canals and the like excavations, comprising members provided with forward cutting edges and adapted to engage the bottom of the excavation and including a central horizontal share and two adjustable horizontal lateral shares extending laterally beyond the central share, means for adjusting the relative positions of the lateral shares, two oblique transverse cutters arranged in parallelism with the axis of progression of the machine and to either side thereof, means for adjusting the spacing and the slope of said oblique cutters, rotary cutters adapted to cut at least part of the sloping sides of said excavation to the front of the oblique cutters, a stem located to the rear of the adjustable members rigid with the central share and assuming cross-sectionally the shape of a rearwardly flaring dihedral, the angle of which opens gradually from the bottom to the top of the stem, said stem being adapted to project laterally the earth cut out in operation, two lateral elevating means adapted to be fed with the earth projected laterally by the lower end of the stem and to raise said earth above the level of the banks to either side of the excavation, means for discharging onto said banks the earth raised by the elevating means, a frame carrying the adjustable members, the rotary cutters, the stem, and the elevating means; a power unit carried by said frame for operating the elevating means, means whereby the power unit operates the rotary cutters, means slidably connecting the oblique cutters with the frame and laterally stabilizing members for the machine carried by a part of its respective oblique cutter.

7. A machine for cleaning and digging ditches, canals and the like excavations comprising a frame, a vertical central section under said frame and a central horizontal blade provided with a cutting edge at the lower part of said central section, two vertical laterally extending flanges in alignment with the vertical central section and fastened with the said central section and frame by means allowing adjustment of the position and slope of their lateral edge so as to match the section of the excavation, blades perpendicular ot said adjustable lateral flanges along the lateral edges thereof and provided with a cutting edge, horizontal blades fastened at the bottom of said last mentioned blades provided with a cutting edge, two lateral elevating means adapted to receive and raise the earth and mud cut by the cutting edges of the blades above the level of the banks to either side of the excavation, means for discharging onto said banks the earth raised by the elevating means, and a power unit for operating the elevating and discharging means.

8. A machine for cleaning and digging ditches, canals and the like excavations comprising a frame, a vertical central section under said frame, said central section assuming cross-sectionally the shape of a rearwardly flaring dihedral, the angle of which opens gradually from the bottom to the top, the rear part of said central section being fast with two lateral vertical flanges and its lower part with a central horizontal blade provided with a cutting edge at the lower part of said central section, two vertical flanges applied on the lateral flanges of the central section and fastened to the said central section by means allowing adjustment of the position and slope of their lateral edges so as to match the section of the excavation, blades perpendicular to said adjustable lateral flanges along the lateral edges thereof and provided with a cutting edge, horizontal blades fastened at the bottom of said last mentioned blades provided with a cutting edge and extending inwardly, two lateral elevating means adapted to raise the earth and mud cut by the cutting edges of the blades above the level of the banks to either side of the excavation, means for discharging onto said banks the earth raised by the elevating means, and a power unit for operating the elevating and discharging means.

9. A machine for cleaning and digging ditches, canals and the like excavations comprising a frame, a vertical central section under said frame and a central horizontal blade provided with a cutting edge at the lower part of said central section, two vertical flanges in alignment with the vertical central section and fastened to the said central section and frame by means for adjusting the position and slope of the lateral edge of each of said flanges so as to match the section of the excavation, blades perpendicular to said adjustable lateral flanges, along the lateral edges thereof and provided with a cutting edge, horizontal blades fastened at the bottom of said last mentioned blades provided with a cutting edge and extending inwardly, rotary cutters adapted to cut at least part of the sloping sides of the excavation, two lateral elevating means adapted to raise the earth and mud cut by the cutting edges of the blades above the level of the banks to either side of the excavation, means for discharging onto said banks the earth raised by the elevating means and a power unit for operating the elevating and discharging means, and rotary cutters.

References Cited in the file of this patent

UNITED STATES PATENTS

| | | |
|---|---|---|
| 799,753 | O'Connor | Sept. 19, 1905 |
| 1,045,834 | Grey | Dec. 3, 1914 |
| 1,765,919 | Heumann | June 24, 1930 |
| 2,705,379 | Fruhling | Apr. 5, 1955 |